United States Patent [19]

Eldin et al.

[11] Patent Number: 4,851,494
[45] Date of Patent: Jul. 25, 1989

[54] CROSSLINKABLE POLYETHER-AMIDE

[75] Inventors: Sameer H. Eldin, Fribourg; Peter Grieshaber, Zumholz, both of Switzerland

[73] Assignee: Ciba-Geigy Corporation, Ardsley, N.Y.

[21] Appl. No.: 219,028

[22] Filed: Jul. 14, 1988

[30] Foreign Application Priority Data

Jul. 24, 1987 [CH] Switzerland ............... 2826/87

[51] Int. Cl.[4] ............ C08G 73/12; C08G 73/14
[52] U.S. Cl. ............ 528/170; 428/474.4; 528/125; 528/173; 528/321; 528/322
[58] Field of Search ........... 528/170, 322, 125, 173, 528/321

[56] References Cited

U.S. PATENT DOCUMENTS 4,115,368  9/1978  Roth et al. ............ 528/229
4,189,560  2/1980  Roth et al. ............ 526/259

FOREIGN PATENT DOCUMENTS 2146344  4/1985  United Kingdom .

OTHER PUBLICATIONS

Journal of Polymer Science: Polymer Physics Edition, vol. 19, pp. 951–969 (1981).
Journal of Polymer Science: Polymer Chemistry Edition, vol. 12, pp. 565–573 (1974).

*Primary Examiner*—Harold D. Anderson
*Attorney, Agent, or Firm*—JoAnn Villamizar

[57] ABSTRACT

Polyether-amides with a specific viscosity of 0.25 to 2.5, measured at 30° C. in a 2% solution in dimethylformamide, containing, based on the total amount of recurring structural elements in the polyether-amide, 100 to 10 mol % of the recurring structural element of the formula I

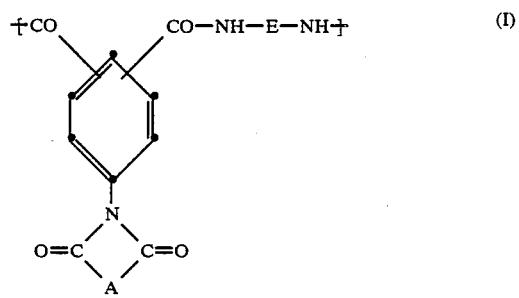

and 90 to 0 mol % of the recurring structural element of the formula II

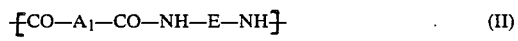

in which A is a radical of the formula

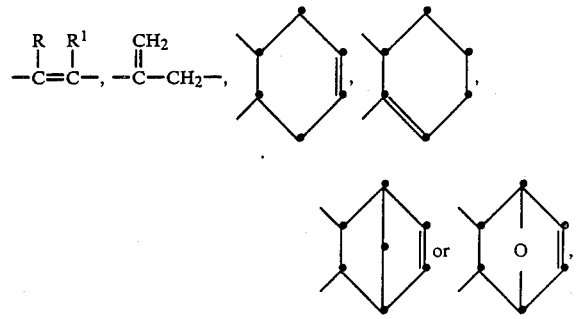

in which R and $R^1$ independently of one another are each a hydrogen, chlorine or bromine atom or methyl, $A_1$ is an aliphatic, cycloaliphatic, aromatic or heterocyclic-aromatic radical of a dicarboxylic acid or of a dicarboxylic acid derivative, E is a polyether radical of the formula III

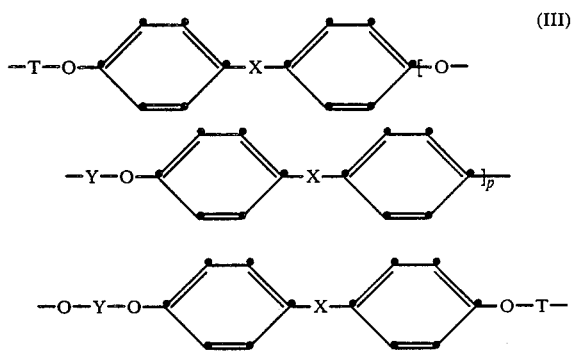

in which p is a number from 1 to 100, T is phenylene, naphthylene or phenanthrylene, X is $-SO_2-$, $-CO-$, $-SO-$, $-N=N-$, $-CF_2-CF_2-$,

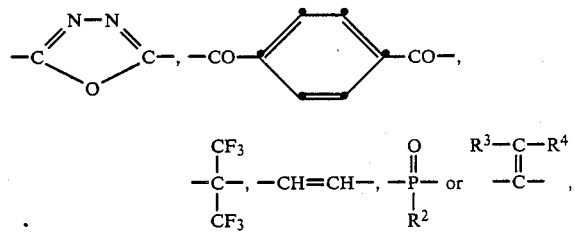

in which $R^2$ is $C_1-C_8$alkyl and $R^3$ and $R^4$ are each a hydrogen or halogen atom, and Y is an organic radical of a mono- or dinuclear, dihydric phenol, are soluble in organic solvents and can be used as covering or coating compositions, as pressing compositions or for the production of films.

12 Claims, No Drawings

CROSSLINKABLE POLYETHER-AMIDE

The present invention relates to crosslinkable polyether-amides containing imidyl groups of unsaturated carboxylic acids, processes for their preparation and the products obtained from the polyether-amides by crosslinking.

German Offenlegungsschrift No. 3,421,949 discloses crosslinkable resin mixtures which contain polyaryl ethers based on hydroquinone or 4,4'-biphenol with a specifically unsaturated end groups which are capable of crosslinking, such as ethynylbenzoyl, maleimidyl or nadimidyl. Polymers with better resistance to solvents are obtained by crosslinking these polyaryl ethers with modified end groups, if appropriate together with reactive plasticizers. These polyaryl ethers with modified end groups have the disadvantage, however, that they are soluble or partly soluble only in specific solvents, such as, for example, N-methylpyrrolidone or sulfolane, so that further processing of the polyaryl ethers with modified end groups is made difficult and is limited to certain processing methods.

It has been found that polyether-amides which contain, within the linear polymer chain, crosslinkable imidyl groups of unsaturated dicarboxylic acids have better processing properties since they are soluble in customary organic solvents. Curing of these polyether-amides results in crosslinked polymers which likewise have high solvent resistance.

The present invention thus relates to polyether-amides with a specific viscosity of 0.25 to 2.5, measured at 30° C. in a 2% solution in dimethylformamide, containing, based on the total amount of recurring structural elements in the polyether-amide, 100 to 10 mol % of the recurring structural element of the formula I

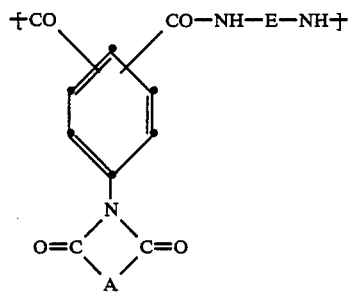                      (I)

and 90 to 0 mol % of the recurring structural element of the formula II

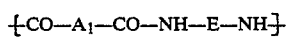                      (II)

in which A is a radical of the formula

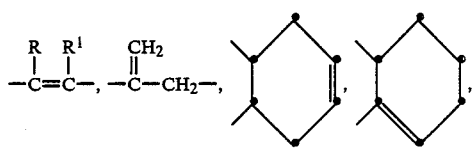

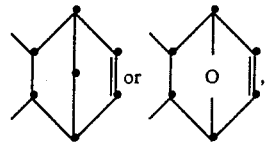

in which R and $R^1$ independently of one another are each a hydrogen, chlorine or bromine atom or methyl, $A_1$ is an aliphatic, cycloaliphatic, aromatic or heterocyclic-aromatic radical of a dicarboxylic acid or of a dicarboxylic acid derivative, E is a polyether radical of the formula III

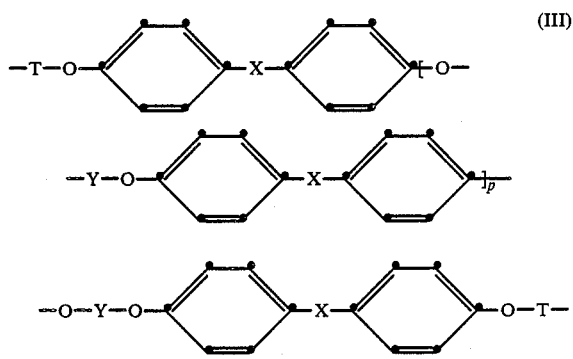                      (III)

in which p is a number from 1 to 100, T is phenylene, naphthylene or phenanthrylene, X is $-SO_2-$, $-CO-$, $-SO-$, $-N=N-$, $-CF_2-CF_2-$,

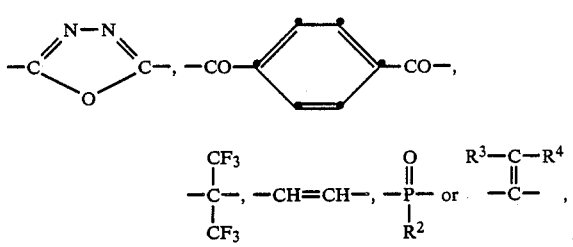

in which $R^2$ is $C_1-C_8$alkyl and $R^3$ and $R^4$ are each a hydrogen or halogen atom, Y is a radical of the formula IV or V

                      (IV)

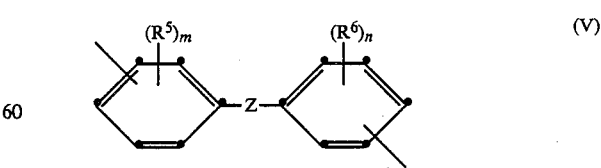                      (V)

in which m and n are each zero or a number from 1 to 4, $R^5$ and $R^6$ are identical or different and are each a halogen atom, unsubstituted or phenyl-substituted $C_1-C_4$alkyl or $C_1-C_4$alkoxy, and, if n and m are each 1 or 2, $R^5$ and $R^6$ are also each allyl and Z is a direct bond or one of the following radicals —O—, —SO—, SO₂—, —S—, —S—S—,

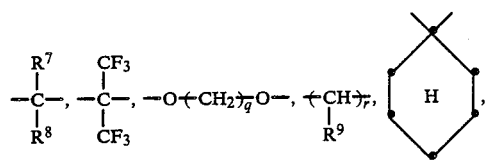

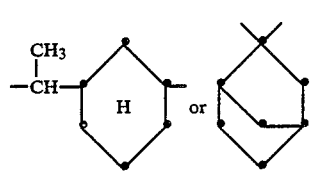

in which $R^7$ and $R^8$ independently of one another are each $C_1$-$C_4$alkyl or phenyl, q is a number from 1 to 100 and, if $R^9$ is a hydrogen atom, r is a number from 1 to 20, or, if $R^9$ is aryl or aralkyl which is unsubstituted or substituted on the nucleus by $C_1$-$C_4$alkyl and has 6 or 10 C atoms in the ring or ring system and up to 10 C atoms in the alkylene radical, r is the number 1.

The polyether-amides according to the invention preferably contain 100 to 50 mol %, in particular 100 mol %, of the recurring structural element of the formula I and 50 to 0% of the recurring structural element of the formula II.

The polyether-amides according to the invention furthermore preferably have a specific viscosity of 0.25 to 1.0, in particular 0.25 to 0.6.

It is generally known that the specific viscosity is a measure of the molecular weight of polymers. The values of 0.25 to 2.5 stated for the specific viscosity correspond to an average molecular weight range of about 1,000 to 40,000.

The radical A in the structural element of the formula I is preferably a radical of the formula,

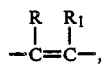

in which R and $R_1$ independently of one another are each an H, chlorine or bromine atom. In particular, the substituents R and $R_1$ are each a hydrogen atom.

In the structural element of the formula I, the two carbonyl groups on the aromatic ring are preferably in the meta-position relative to the imidyl group.

The radical $A_1$ in the structural element of the formula II is preferably a radical of an aliphatic or aromatic dicarboxylic acid.

In the structural element of the formula III, p is preferably a number from 1 to 10, in particular from 1 to 5, and T is preferably phenylene or naphthylene, in particular phenylene.

The radical X in the structural element of the formula III is preferably —SO₂—, —CO—, —SO—, —CF₂—CF₂—,

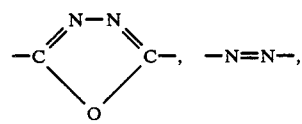

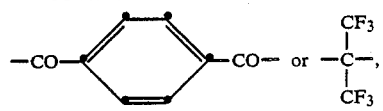

in particular —SO₂— or —CO—.

The radical Y in the structural element of the formula III preferably consists of a radical of the formula V in which the free valencies are in the para-position relative to the radical Z, n and m are each zero, 1 or 2, $R^5$ and $R^6$ are each $C_1$-$C_4$alkyl and Z is —O—, —S—, isopropylidene, hexafluoroisopropylidene, —O—(CH₂)_qO— or

in which q is preferably a number from 4 to 20, $R^9$ is a hydrogen atom and r is preferably a number from 1 to 10.

In particular, Y is a radical of the formula V in which the free valencies are in the p-position relative to the radical Z, m and n are zero and Z is —O—, isopropylidene, hexamethylene, α,ω-dioxohexamethylene or α,ω-dioxodecamethylene.

The polyether-amides according to the invention containing certain amounts of the recurring structural elements of the formulae I and II can be prepared by subjecting a polyether-diamine of the formula VI

$$H_2N-E-NH_2 \qquad (VI)$$

to polycondensation with approximately equimolar amounts of a compound of the formula VII

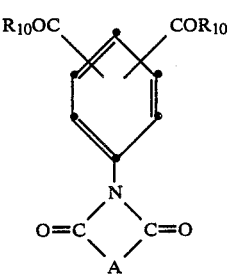

(VII)

or with a mixture of a compound of the formula VII and a dicarboxylic acid contained therein in an amount of up to 90 mol % or a dicarboxylic acid derivative, of the formula VIII

$$R_{10}OC-A_1-COR_{10} \qquad (VIII)$$

in which E, A and $A_1$ have the same meaning as in formula I or II and $R_{10}$ is a halogen atom a hydroxyl group, an unsubstituted or substituted phenoxy group or an alkoxy group with 1-18 C atoms, in a polar aprotic solvent until the resulting polyether-amide has a specific viscosity of 0.5 to 2.5, measured at 30° C. on a 2% solution in dimethylformamide.

The process according to the invention is preferably carried out using equimolar amounts of compounds of the formula VI with compounds of the formula VII or with a mixture of compounds of the formula VII and compounds of the formula VIII. However, it is also

possible for the compound of the formula VI or that of the formula VII or the mixture of a compound of the formula VII and a compound of the formula VIII to be used in a slight equimolar excess, so that polyether-amides with only H₂N— or R₁₀OC-end groups are obtained. If desired, such end groups can be further reacted to introduce reactive, olefinically unsaturated end groups or non-reactive end groups into the polyether-amide molecule. For example reaction of the polyether-amides according to the invention with amino end groups with olefinically unsaturated dicarboxylic acid anhydrides, for example, maleic anhydride, citraconic anhydride or itaconic anhydride, in a molar ratio of 1:2 and subsequent cyclization of the amide acid groups formed to form the corresponding imide groups gives polyether-amides with unsaturated imidyl end groups. The polyether-amides containing amino end groups can also be reacted with 4-maleimidylbenzoyl chloride, in which case the cyclization step is omitted. The polyether-amides according to the invention containing amino end groups can be reacted analogously with aliphatic or aromatic saturated compounds, such as, for example, benzoyl chloride or α-chloromethyltoluene, to give polyether-amides with non-reactive end groups.

The R₁₀OC-end groups of the polyether-amides according to the invention can likewise be modified. For example, the acid chloride end groups can be converted into reactive or non-reactive end groups by reaction with 4-maleimidylaniline or aniline.

The preferred polyether-amides are prepared by reacting a polyether-diamine of the formula VI with a mixture of 100 to 50 mol % of a compound of the formula VII and 50 to 0 mol % of a compound of the formula VIII.

The particularly preferred polyether-amides according to the invention are prepared by subjecting a polyether-diamine of the formula VI to polycondensation with a compound of the formula VII.

The polycondensation reaction is preferably carried out up to a specific viscosity of the polyether-amides of 0.25 to 1.0, in particular 0.25 to 0.6.

The hydrogen halide obtained in the polycondensation of compounds of the formula VII and if appropriate VIII, in which R₁₀ is a halogen atom, with compounds of the formula VI can be removed by neutralization with basic substances, such as calcium hydroxide and triethylamine, or by reaction with an epoxide compound, such as ethylene oxide or propylene oxide, and by washing with suitable solvents, for example water.

Polar aprotic solvents which are used in the polycondensation process for preparation of the polyether-amides are, for example, dimethyl sulfoxide, dimethylacetamide, diethylacetamide, 1,3-dimethyl-2-imidazolidinone, tetramethylurea, N-methylcaprolactam, N-methylpyrrolidone, acetone, dioxane, ethyl acetate and tetrahydrofuran.

The polyether-diamines of the formula VI can be prepared by the process described in Journal of Polymer Science, Polymer Chemistry Edition, 12, (1974), page 565 et seq. by reacting p+1 mol of a dihydro phenol of the formula IX

HO—Y—OH            (IX)

with p+2 mol of a dihalogen compound of the formula X

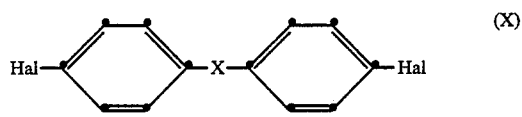

in which p, X and Y are as defined in the case of formula III and Hal is a halogen atom, in an aprotic solvent and in the presence of an alkali to give a polyether containing halogen end groups and then reacting the terminal halogen groups with an aminophenol to give compounds of the formula VI.

The phenols of the formula IX are known and are in some cases commercially available. Examples of such compounds are hydroquinone, methylhydroquinone, 2,3-dimethylhydroquinone, 2,5-bis-[α-phenylethyl]-hydroquinone, resorcinol, 2-allylresorcinol, 4,4'-dihydroxydiphenyl, bis-(4-hydroxyphenyl)ether, 4,4'-dihydroxy-2,6-dimethyldiphenyl ether, bis-(4-hydroxy-3-isobutylphenyl)ether, bis-(4-hydroxy-3-isopropylphenyl)ether, bis-(4-hydroxy-3-chlorophenyl)ether, bis-(4-hydroxy-3-fluorophenyl)ether, bis-(4-hydroxy-3-bromophenyl)ether, 4,4'-dihydroxy-3,6-dimethoxydiphenyl ether, 4,4'-dihydroxy-2,5-diethoxydiphenyl ether, bis-(4-hydroxyphenyl)sulfone, 5'-chloro-4,4'-dihydroxydiphenyl sulfone, bis-(4-hydroxyphenyl)-thioether, bisphenol A, 3,3'-diallylbisphenol A, tetraallylbisphenol A, 2,2-bis-(3-methyl-4-hydroxyphenyl)-propane, 2,2-bis-(2,3,5,6-tetramethyl-4-hydroxyphenyl)-propane, 2,2-bis-(3-phenyl-4-hydroxyphenyl)-propane, 2,2-bis-(3-isopropyl-4-hydroxyphenyl)-propane, 2,2-bis-(2-isopropyl-4-hydroxyphenyl)-propane, 2,2-bis-(3,5-dibromo-4-hydroxyphenyl)-propane, 2,2-bis-(4-hydroxyphenyl)-pentane, 3,3-bis-(4-hydroxyphenyl)-pentane, 2,2-bis-(4-hydroxyphenyl)-1-phenylpropane and 2,2-bis-(4-hydroxyphenyl)-1,1,1,3,3,3-hexafluoropropane.

Compounds of the formula IX in which Y is a radical of the formula —O—(—CH₂—)$_q$—O— are known, for example, from Journal of Polymer Science; Polymer Physics Edition, Volume 19, 951 et seq. (1981). If Y in formula IX is a radical of the formula

it is, for example, bisphenol F, 3,3'-diallylbisphenol F, bis-(4-hydroxyphenyl)-phenylmethane, bis-(4-hydroxy-2,6-dimethyl-3-methoxyphenyl)-methane or an α,ω-di-(p-hydroxyphenyl)-alkane, such as 1,2-bis-(4-hydroxyphenyl)-ethane or 1,6-bis-(4-hydroxyphenyl)-hexane. The α,ω-di-(p-hydroxyphenyl)-alkanes can be prepared, for example, by the process disclosed in "The Journal of the American Chemical Society", Volume 62 (1940), pages 413–415, by subjecting a linear alkanedicarboxylic acid dichloride with 1 to 98 C atoms in the linear alkylene chain to condensation with an alkyl phenyl ether, for example anisole or phenetole in a molar ratio of 1:2 to give the corresponding diketone compound, HCl being split off, and then hydrogenating the two keto groups to methylene groups and subsequently hydrolyzing the two alkoxy groups.

The dihalogen compounds of the formula X are likewise known compounds which are in some cases commercially available. Examples of suitable compounds are 4,4'-dichlorodiphenyl sulfone, 4,4'-difluorodiphenyl sulfone, 4,4'-dichlorodiphenyl sulfoxide, 4,4'- dichlorobenzophenone, 4,4'-dichloroazobenzene, 1,2-bis-(p-chlorophenyl)-tetrafluoroethane and 2,2-bis-(p-fluorophenyl)-hexafluoropropane.

The compounds of the formula VII are likewise known and can be prepared by the process described in German Offenlegungsschrift No. 2,626,832, by reacting an aromatic aminodicarboxylic acid or derivative thereof of the formula XI

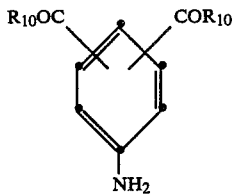

with an anhydride of the formula XII

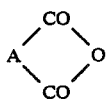

in which $R_{10}$ and A are as defined in the case of formula VII, and then cyclizing the amide-dicarboxylic acid formed to give the compound of the formula VII.

The dicarboxylic acids and dicarboxylic acid derivatives, as defined, of the formula VIII are likewise known and in some cases commercially available. Examples which may be mentioned of such compounds are: malonic acid, dimethylmalonic acid, succinic acid, glutaric acid, adipic acid, suberic acid, sebacic acid and dodecanedicarboxylic acid, 1,3-cyclopentane-dicarboxylic acid, hexahydroisophthalic acid, hexahydroterephthalic acid, terephthalic acid, isophthalic acid, 4,4'-dicarboxydiphenylethane, naphthalene-2,6-dicarboxylic acid, thiophene-2,5-dicarboxylic acid, pyridine-2,3-dicarboxylic acid and the corresponding dichlorides and the diesters as defined.

The polyether-amides according to the invention can be used and processed in the manner customary for thermoplastics. For example, they can be used as pressing, covering or coating compositions or for the production of films. Before application, the customary additives, for example fillers, pigments, stabilizers or reinforcing agents, such as carbon fibres, boron fibres or glass fibres, can be added to the polyether resins present as pressing powders, melts or solutions in a customary organic solvent. The polyether resins according to the invention can also be processed together with thermosetting resins, for example epoxy resins or bismaleimides, or with other thermoplastics, for example polyesters, polyamides, polyimides, polyolefins or polyurethanes, in particular with the conventional polyether resins.

The polyether-amides according to the invention are preferably suitable as laminating resins for the production of fibre laminate systems, it being possible for the fibres usually employed in fibre reinforcing of materials to be used as reinforcing fibres. These can be organic or inorganic fibres, natural fibres or synthetic fibres, such as Aramid fibres, and they can be in the form of fibre bundles or continuous fibres. Examples of reinforcing fibres used are glass, asbestos, boron, carbon and metal fibres, preferably carbon and metal fibres. Such fibres and fabric therefrom are commercially available.

As mentioned above, the polyether-amides according to the invention can be crosslinked in a manner which is known per se, for example thermally by heating to about 50° to 350° C. or chemically.

The present invention thus also relates to the products obtained by crosslinking the polyether resins according to the invention.

If appropriate, thermal crosslinking can be carried out in the presence of agents which form free radicals, for example inorganic or organic peroxides, such as potassium peroxide-sulfate or benzoyl peroxide, azo compounds, such as azoisobutyronitrile, organic hydriperoxides, such as cumene hydroperoxide or tert-butyl hydroperoxide, α-halogenoacetophenone, benzoin or ethers thereof, benzophenone, benzopinacol, benzil acetals, anthraquinones, arsines, phosphines, thioureas, redox initiator systems, anaerobic initiator systems or metal salts.

In the case of crosslinking of the polyether-amides according to the invention by means of high-energy irradiation, this can be carried out, for example, with X-rays, accelerated electrons, γ-rays emitted from a $60_{Co}$ source or UV rays.

Crosslinking of the polyether-amides according to the invention gives polymers which are no longer soluble in the customary organic solvents and are also distinguished by high glass transition temperatures and by a high resistance to water and heat.

Unless indicated otherwise, the specific viscosities ($\eta_{sp}$) stated in the following examples are measured at 30° C. on a 2% solution of the polymer in dimethylformamide.

EXAMPLE A

Preparation of a polyether-diamine based on bisphenol A 200 ml of dimethyl sulfoxide, 200 ml of toluene, 50.22 g (0.22 mol) of bisphenol A and 24.23 g (0.222 mol) of 4-aminophenol are taken in a 750 ml sulfating flask which is always flushed thoroughly with $N_2$ and is provided with a stirrer, thermometer, water separator, cooler and $N_2$ connection, and are heated to 60°–70° C., with stirring. At an internal temperature ($T_i$) of about 60° C., 52.8 g of a 50% aqueous sodium hydroxide solution are added to the pale brown clear solution. At about 70° C., a dark brown solution is present. Heating is continued and water is distilled off azeotropically and removed via the water separator. After 5.7 hours, only a very small amount of water is distilled off at a $T_i$ of 115° C., and after 6.9 hours no further water is distilled off at a $T_i$ of 115° C. The toluene in the water separator is separated off and the remainder of the toluene is distilled off at about 160° C. After cooling to 120°–130° C., 94.77 g (0.33 mol) of recrystallized dichlorodiphenyl sulfone are introduced in portions into the reaction solution, whereupon a slight exothermic reaction starts. The reaction mixture is then heated to 155°–160° C. and kept at this temperature for 2 hours. It is subsequently filtered at 80° C., the filter is rinsed with a little dimethyl sulfoxide and the polymer is precipitated in 3 liters of water containing 2% by weight of potassium hydroxide solution and 1% by weight of $K_2SO_3$. After filtration, the precipitate is washed with 1% $K_2SO_3$ solution, 2 liters of distilled water and 2 liters of isopropanol and dried in vacuo at 60°–70° C.

Yield: 143.1 g (98.8% of theory).

Amine equivalent weight=666.5 (in accordance with the titration method of S. R. Palit, Ind. Eng. Anal., 18 (1946)).

Molecular weight (MW) according to amine titration=1,333.

Theoretical MW 1,316.

EXAMPLE B

Preparation of a Polyether-diamine Based on 1,6-bis-(p-hydroxyphenyl)-hexane

A polyether-diamine is prepared by the procedure described in Example A using the following starting substances: 59.46 g (0.22 mol) of 1,6-bis-(p-hydroxyphenyl)-hexane (recrystallized), 94.77 g (0.33 mol) of 4,4'-dichlorodiphenyl sulfone, 24.23 g (0.222 mol) of 4-aminophenol, 52.80 g (0.66 mol) of 50% aqueous sodium hydroxide solution, 200 ml of dimethyl sulfoxide and 200 ml of toluene.

Yield: 153.2 g (99.4% of theory).
Amine equivalent weight=734.5.
MW according to amine titration=1,469.

EXAMPLES C TO I

Preparation of Polyether-diamines Using Various Dihydric Phenols

The polyether-diamines C to I are prepared analogously to the procedure described in Example A using the following starting substances.

EXAMPLE 1

(a) Preparation of a Polyether-Amide 40.0 g (0.030 mol) of polyether-diamine according to Example A are dissolved in 335 ml of dimethylacetamide at 23° C. under an $N_2$ atmosphere. The dark brown clear solution formed is cooled to 0°-5° C. and 5.96 g (0.020 mol) of 5-maleimidylisophthaloyl dichloride are added at 2° C. The reaction solution is subsequently stirred at 0°-5° C. for 30 minutes and then warmed at room temperature for 2 hours, with stirring. 4.0 g (0.04 mol) of triethylamine are then added at 24° C. and precipitated as triethylamine hydrochloride. The mixture is subsequently stirred at 24° C. for a further hour and then filtered at this temperature and washed with a little dimethylacetamide. The clear solution of the polyether-amide is returned to the flask.

1.96 g (0.020 mol) of maleic anhydride are added to the polyether-amide solution at 24° C. and the reaction solution is warmed to 40° to 50° C. and kept at 44° C. for 1 hour. After cooling to room temperature, 5.1 g (0.05 mol) of acetic anhydride, 1.0 g (0.01 moil) of triethylamine and 0.128 g (0.0005 mol) of nickel acetate are added to the reaction solution, which is then stirred at 24° C. for 15.5 hours. The polymer is precipitated to 2 liters of water, filtered off, washed with water and ethanol and then dried at 70°-80° C. Yield: 42.6 g.

The polymer is dried at 200° C. under a high vacuum for 8 hours. It is soluble in dimethylformamide and dimethylacetamide.

| Polyether-diamine | Dihydric phenol | Dihalogen compound | Yield (% of theory) | Amine equivalent weight |
|---|---|---|---|---|
| C | HO—⌬—OH | Cl—⌬—SO₂—⌬—Cl | 97.6 | 562.5 |
| D | HO—⌬—C(CH₃)₂—⌬—OH | Cl—⌬—CO—⌬—Cl | 96.5 | 670 |
| E | HO—⌬—O—⌬—OH | Cl—⌬—SO₂—⌬—Cl | 99.1 | 677.5 |
| F | HO—⌬—CH₂—⌬—OH | Cl—⌬—SO₂—⌬—Cl | 98.3 | 647.5 |
| G | HO—⌬—O(CH₂)₆O—⌬—OH | Cl—⌬—SO₂—⌬—Cl | 95.1 | 760 |
| H | HO—⌬—O(CH₂)₁₀O—⌬—OH | Cl—⌬—SO₂—⌬—Cl | 97.0 | 857.5 |
| I | HO—⌬—C(CF₃)₂—⌬—OH | Cl—⌬—SO₂—⌬—Cl | 94.6 | 964 |

C═C double bond content (microhydrogenation): 1.0 mmol $H_2$/g, which corresponds to an MW of 4,000 (theory 4,507).

MW by gel permeation chromatography: Mn=3,770, Mw=7,420.

Specific viscosity $\eta_{sp}$=0.338

(b) Preparation of a Shaped Article 6.6 g of the polyether-amide obtained above are introduced in the form of two tablets prepressed at room temperature into a pressing mould preheated to 220° C. The pressure is increased to 20.0 to $24.5 \times 10^5$ Pa in the course of 3 minutes. After 5 minutes, the mould is further heated to 280° C. and kept at this temperature (pressure $24.5 \times 10^5$ Pa) for 1 hour. It is then cooled to below 150° C. under pressure and the article is released from the mould.

Glass transition temperature=228° C. (DMA apparatus, 10° C./minute, DuPont).

Impact flexural strength according to DIN 51230=17.2 kJ/$m^2$ (Dynstat apparatus).

(c) Production of a Laminate

A carbon fibre fabric (G 814 NT from Brochier S. A.) is impregnated with a 27% solution of the polyether-amide prepared according to Example 1a in dimethylformamide by being dipped in this twice. After each impregnation, the carbon fibre fabric is dried at room temperature for 10 minutes and at 180° C. in a circulating air oven for 10 minutes. Finally, the fabric is dried again at 230° C. for 10 minutes. 8 layers of the prepreg thus prepared with dimensions of 13.5×14.5 cm are wrapped in Kapton ® film (poly-(diphenyl oxide pyromellitimide) from DuPont) and the entire system is covered on the top and bottom with copper foil, placed at 280° C. in a preheated mould and pressed at 280° C., the pressure being increased to $91.2 \times 10^5$ Pa within 60 seconds. These pressing conditions are maintained for 1 hour. The press is then cooled to below 150° C. under pressure and the pressed article is removed from the press. Glass transition temperature=253°/247° C. (DMA apparatus, 10° C./minute, DuPont).

EXAMPLE 2

(a) Preparation of a Polyether-Amide

A polyether-amide is prepared by the procedure described in Example 1a using the following compounds:

44.07 g (0.03 mol) of polyether-diamine according to Example B, 5.96 g (0.02 mol) of 5-maleimidylisophthaloyl dichloride, 335 ml of dimethylacetamide and 4.0 g (0.04 mol) of triethylamine.

The polyether-amide obtained is then reacted with 1.96 g (0.02 mol) of maleic anhydride and the amide acid groups are imidized with 5.10 g (0.050 mol) of acetic anhydride, 1.0 g (0.01 mol) of triethylamine and 0.128 g (0.0005 mol) of nickel acetate.

Yield: 47.2 g

The product is dried under a high vacuum at 200° C. for 8 hours. It is soluble in dimethylformamide and dimethylacetamide.

C═C double bond content (microhydrogenation): 0.9 mmol of $H_2$/g, which corresponds to a molecular weight of 4,444 (theory 4,591).

MW by gel permeation chromatography: Mn 4,390, Mw 11,640.

Specific viscosity $\eta_{sp}$=0.549.

(b) Production of a Shaped Article

The production of a shaped article is carried out in a manner analogous to that described under Example 1b, with the difference that a pressing temperature of 250° C. is used. The resulting shaped article has the following properties:

Glass transition temperature=153° C. (DMA apparatus).

Impact flexural strength=23.5 kJ/$m^2$.

EXAMPLE 3

Polyether-amides C to I are prepared by the procedure described in Example 1a by reacting the polyether-diamines C to I in each case with 5-maleimidylisophthaloyl dichloride in a molar ratio of 3:2 and then converting the $NH_2$ end groups into maleimidyl groups by reaction with maleic anhydride. The properties of the resulting polyetheramides are shown in the following table.

| Poly-ether-amide | Tg (DMA) [°C.] | Molecular weight[1] | Mn[2] | Mw[2] | Tg (DMA) [°C.] | Impact flexural strength DIN 51230 [kJ/$m^2$] |
|---|---|---|---|---|---|---|
| C | 200 | 4440 | 2510 | 3990 | 246 | 6.8 |
| D | 156 | 3330 | 2910 | 5730 | 162 | 11.1 |
| E | 167 | 3300 | 2064 | 3768 | 209 | 15.6 |
| F | 195 | 4400 | 1671 | 2801 | 199 | 9.5 |
| G | 145 | 4000 | 2948 | 5052 | 166 | 13.9 |
| H | 96 | 4200 | 3540 | 7770 | 105 | 29.5 |
| I | 172 | 4400 | 2720 | 5160 | 209 | 4.6 |

[1]calculated on the basis of the C═C content (microhydrogenation)
[2]Gel permeation chromatography
[3]Dynamic mechanical analysis, 10° C./minute (Du Pont)

EXAMPLE 4

(a) Preparation of a Polyether-Amide

A polyether-amide is prepared by the procedure described in Example 1a using the following compounds: 32.20 g (0.06 mol) of polyether-diamine according to Example A, 11.92 g (0.04 mol) of 5-maleimidylisophthaloyl dichloride, 500 ml of dimethylacetamide and 8.0 g (0.08 mol) of triethylamine.

The resulting polyether-amide is then reacted with 5.62 g (0.04 mol) of benzoyl chloride and 4.0 g (0.04 mol) of triethylamine.

The product is dried at 80°-90° C. in vacuo. It is soluble in dimethylformamide and dimethylacetamide.

Yield: 93.3 g (96.9% of theory).

C═C double bond content (microhydrogenation): 0.6 mmol of $H_2$/g, which corresponds to a molecular weight of 3,300.

MW by gel permeation chromatography: Mn 1,900, Mw 3,530.

(b) Production of a Shaped Article

The production of a shaped article is carried out in a manner analogous to that described under Example 1b. The resulting shaped article has the following properties:

Glass transition temperature: 177° C. (DMA).
Impact flexural strength: 3.4 kJ/m².

EXAMPLE 5

(a) Preparation of a Polyether-Amide 440.7 g (0.30 mol) of polyether-diamine according to Example A are dissolved in 3,600 ml of dimethylacetamide under an N₂ atmosphere. The red-brown clear solution formed is cooled to 0°–5° C. 59.62 g (0.20 mol) of 5-maleimidylisophthaloyl dichloride are added in 4 portions at 0° C. in the course of 20 minutes. The temperature is kept at 0°–5° C. by gentle cooling. The reaction solution is subsequently stirred at 0°–5° C. for 1 hour. 47.12 g (0.20 mol) of 5-maleimidylbenzoyl chloride are then added in 4 portions in the course of 20 minutes. The reaction solution is subsequently stirred for 1 hour, whereupon the temperature is allowed to rise to 20°–25° C. 60.7 g (0.60 mol) of triethylamine are then added at 20° C., and rapidly precipitate as the hydrochloride. The mixture is subsequently stirred at 25° C. for a further hour and is then filtered at this temperature and the filter is rinsed with a little dimethylacetamide. The polymer is precipitated four times in 2.5 liters of water, filtered off, washed with water and ethanol and then dried at 80°–90° C. in vacuo.

Yield: 523.0 g (99.5% of theory).

The polymer is soluble in dimethylformamide and dimethylacetamide. C═C double bond content (microhydrogenation): 1.0 mmol of H₂/g, which corresponds to an MW of 4,000.

MW by gel permeation chromatography: Mn 2,700, Mw 5,350.

Specific viscosity $\eta_{sp}=0.311$ (2.0%, dimethylformamide, 25° C.).

(b) Production of a Shaped Article

The production of a shaped article is carried out in a manner analogous to that described under Example 1b. The resulting shaped article has the following properties:

Glass transition temperature: 207° C. (DMA).
Impact flexural strength: 18.6 kJ/m².

What is claimed is:

1. A polyether-amide with a specific viscosity of 0.25 to 2.5, measured at 30° C. in a 2% solution in dimethylformamide, containing, based on the total amount of recurring structural elements in the polyether-amide, 100 to 10 mol % of the recurring structural element of the formula I

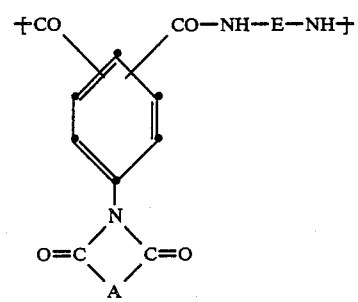

and 90 to 0 mol % of the recurring structural element of the formula II

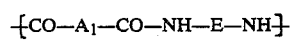

in which A is a radical of the formula

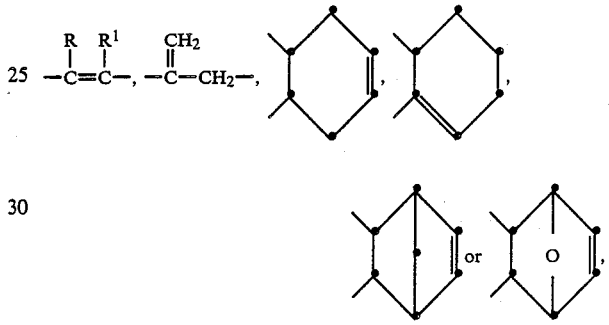

in which R and R¹ independently of one another are each a hydrogen, chlorine or bromine atom or methyl, A₁ is an aliphatic, cycloaliphatic, aromatic or heterocyclic-aromatic radical of a dicarboxylic acid or of a dicarboxylic acid derivative, E is a polyether radical of the formula III

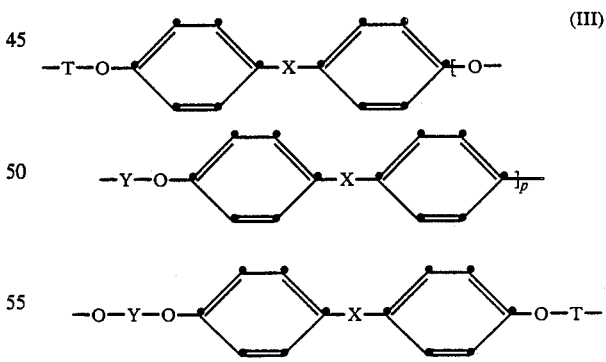

in which p is a number from 1 to 100, T is phenylene, naphthylene or phenanthrylene, X is —SO₂—, —CO—, —SO—, —N═N—, —CF₂—CF₂—,

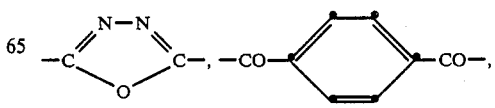

-continued

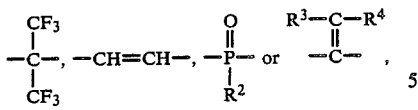 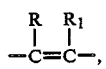

in which $R^2$ is $C_1$–$C_8$alkyl and $R^3$ and $R^4$ are each a hydrogen or halogen atom, Y is a radical of the formula IV or V

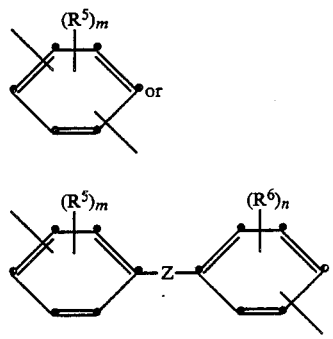

in which m and n are each zero or a number from 1 to 4, $R^5$ and $R^6$ are identical or different and are each a halogen atom, unsubstituted or phenyl-substituted $C_1$–$C_4$alkyl or $C_1$–$C_4$alkoxy, and when n and m are each 1 or 2, $R^5$ and $R^6$ are also each allyl and Z is a direct bond or Z represents one of the following radicals —O—, —SO—, $SO_2$—, —S—, —S—S—,

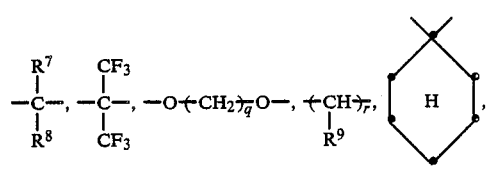

in which $R^7$ and $R^8$ independently of one another are each $C_1$–$C_4$alkyl or phenyl, q is a number from 1 to 100 and, when $R^9$ is a hydrogen atom, r is a number from 1 to 20, or, when $R^9$ is aryl or aralkyl which is unsubstituted or substituted on the nucleus by $C_1$–$C_4$alkyl and has 6 or 10 C atoms in the ring or ring system and up to 10 C atoms in the alkylene radical, r is the number 1.

2. A polyether-amide according to claim 1, which contains 100 to 50 mol % of the recurring structural element of the formula I and 50 to 0 mol % of the recurring structural element of the formula II.

3. A polyether-amide according to claim 1, which contains 100 mol % of the recurring structural element of the formula I.

4. A polyether-amide according to claim 1, in which the radical A in the structural element of the formula I is a radical of the formula in which R and $R_1$ independently of one another are each an H, chlorine or bromine atom.

5. A polyether-amide according to claim 1, in which $A_1$ in formula II is a radical of an aliphatic or aromatic dicarboxylic acid.

6. A polyether-amide according to claim 1, in which, in formula III, p is a number from 1 to 10 and T is phenylene or naphthylene.

7. A polyether-amide according to claim 1, in which, in formula III, p is a number from 1 to 5.

8. A polyether-amide according to claim 1, in which X in the structural element of the formula III is —$SO_2$—, —CO—, —SO—, —$CF_2$—$CF_2$—,

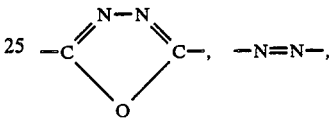

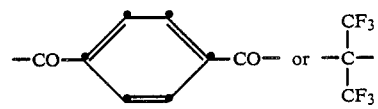

9. A polyether-amide according to claim 1, in which Y in the structural element of the formula III consists of a radical of the formula V in which the free valencies are in the para-position relative to the radical Z, n and m are each zero, 1 or 2, $R^5$ and $R^6$ are each $C_1$–$C_4$alkyl and Z is —O—, —S—, isopropylildene, hexafluoroisopropylidene, —O—(—$CH_2$—)$_q$—O— or

in which q is a number from 4 to 20, $R^9$ is a hydrogen atom and r is a number from 1 to 10.

10. A polyether-amide according to claim 1, in which Y in the structural element of the formula III consists of a radical of the formula V in which the free valencies are in the p-position relative to the radical Z, m and n are zero and Z is —O—, isopropylidene, hexamethylene, α,ω-dioxohexamethylene or α,ω-dioxodecamethylene.

11. A process for the preparation of a polyether-amide according to claim 1, which comprises subjecting a polyether-diamine of the formula VI $$H_2N-E-NH_2 \quad (VI)$$

to polycondensation with approximately equimolar amounts of a compound of the formula VII

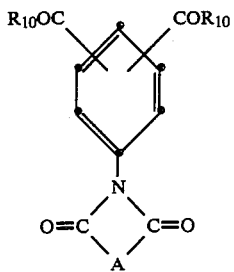 (VII)

or with a mixture of a compound of the formula VII and a dicarboxylic acid contained therein in an amount of up to 90 mol % or a dicarboxylic acid derivative, of the formula VIII $$R_{10}OC-A_1-COR_{10} \quad (VIII)$$

in which E, A and $A_1$ have the same meaning as in formula I or II and $R_{10}$ is a halogen atom, a hydroxyl group, an unsubstituted or substituted phenoxy group or an alkoxy group with 1-18 C atoms, in a polar aprotic solvent until the resulting polyether-amide has a specific viscosity of 0.5 to 2.5, measured at 30° C. on a 2% solution in dimethylformamide.

12. A crosslinked polyether-amide obtained by crosslinking a polyether-amide according to claim 1.

* * * * *